United States Patent Office 3,497,206
Patented Feb. 24, 1970

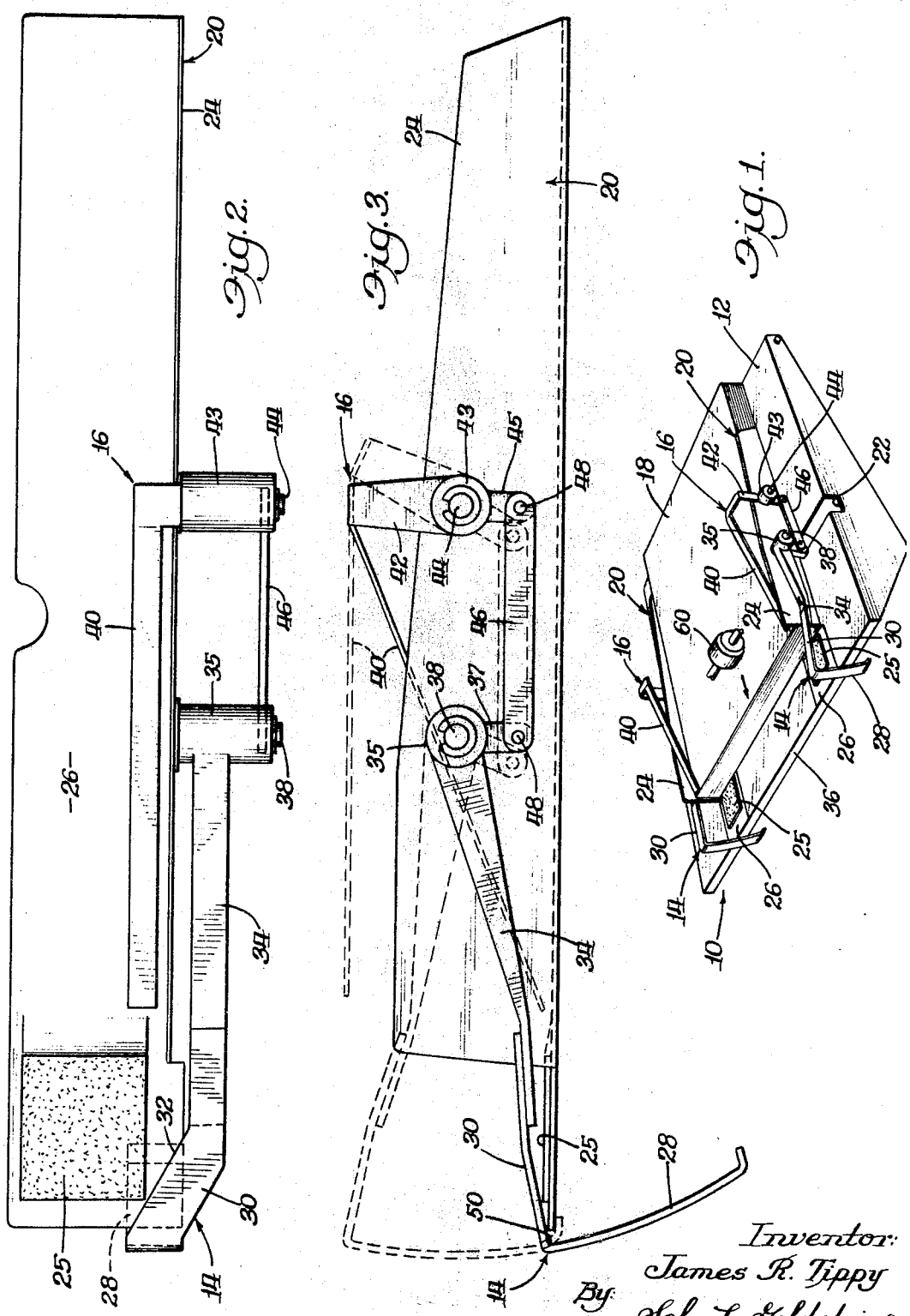

3,497,206
SHEET FEEDER
James R. Tippy, Buffalo Grove, Ill., assignor to Addressograph-Multigraph Corporation, Mount Prospect, Ill., a corporation of Delaware
Filed Feb. 29, 1968, Ser. No. 709,357
Int. Cl. B65h 1/04, 3/06
U.S. Cl. 271—61          17 Claims

ABSTRACT OF THE DISCLOSURE

A sheet feeding device which employs sheet separating elements acting on the uppermost sheet in the stack is provided with controls that automatically position the separator elements. The separating elements are mechanically linked to a lever which is raised by the height of the stack as it is loaded for feeding, thereby regulating the movement of the separator elements.

BACKGROUND OF INVENTION

This invention relates generally to stack sheet feeder devices and more particularly to feeders equipped with corner separators that are automatically operated by the height of the stack loaded into the feeder.

Conventional sheet feeding devices are equipped with a tray that carries a stack of sheets, separator elements mounted at the forward end of the tray, and means for advancing a sheet from the stack. When the operator loads the tray with a stack of sheets, he moves the separator elements to a raised position and slips the stack under the separator elements. If the operator forgets or incorrectly manipulates the separator elements, the stack will be improperly loaded resulting in skew or multiple feeding of sheets. U.S. Patent No. 3,319,956 suggests spring loading the separator elements and making them responsive to the position of the stack advancing means relative to the top of the stack. When the operator raises the sheet advancing means, the separator elements automatically are raised. As a result, the operator never has an opportunity to incorrectly load the tray by forgetting to lift the separator elements or by improperly manipulating the separator elements.

BRIEF DESCRIPTION OF INVENTION

My invention pertains to a tray used with a stack of sheets that are to be individually fed into the machine, and comprises a platen for supporting the stack, separator means mounted at the forward end of the platen and movable between an inoperative and operative position relative to the stack, said separator means in the operative position acting on the stack to separate a single sheet from the stack, and lift means coupled to the separator means responsive to the loading of the stack on the platen for moving the separator means to said operative position as the stack is loaded.

The principal object of my invention is to provide an improved tray for use with a stack of sheets that automatically moves the separator means to an operative position relative to the stack when the operator loads the stack on the tray, ensuring that the separator means is properly associated with the stack.

Another object of my invention is to provide a tray device as mentioned above having simple, reliable, and economical means which, in response to the positioning of the stack on the tray, automatically lift the separator means permitting the operator to slip the stack under said separator means.

DESCRIPTION OF DRAWINGS

Further objects and advantages of my invention will become apparent upon studying the following description in conjunction with the accompanying drawings, in which:

FIGURE 1 is a perspective view of the tray device of my invention illustrating the loading of a stack of sheets;

FIGURE 2 is a plan view of a side guide associated with the tray illustrating the mounting of separator elements and lift members; and FIGURE 3 is a side elevational view of the side guide shown in FIGURE 2.

DESCRIPTION OF PREFERRED EMBODIMENT

As illustrated in the drawings, the major components of the tray 10 of my invention are a platen 12, corner separator elements 14, and lift members 16 for the separator elements. The platen 12 supports a stack 18 of sheets. The separator elements 14 during the feeding operation separate the topmost sheet from the stack 18. And the lift members 16, in response to the positioning of the stack 18 on the platen 12, move the separator elements 14 from an inoperative position to an operative position. In the operative position, the separator elements 14 engage the top front corners of the stack 18.

The platen 12 is mounted at the infeed station of a duplicating or like machine (not shown), and it carries a pair of adjustable, L-shaped side guides 20 for laterally confining the stack 18. The guides 20 ride in a slot 22 in the platen 12. Under some circumstances a single side guide 20 will suffice.

When the operator wishes to adjust the spacing between the guides 20 to accommodate a particular stack width, he merely grasps the guides and slides them along the slot 22 until their location relative to each other is proper to receive the stack.

Each side guide 20 includes an upright wall 24 and a base 26. The uprights 24 restrict the lateral movement of the sheets and serve as a support for the separator elements 14 and lift members 16. The separator elements 14 and lift members 16, however, may be mounted on any suitable support member and need not be directly attached to the uprights 24. Friction pads 25 on the bases 26 hold the stack 18 steady during feeding operations.

The corner separator elements 14 are of a conventional design including a front stop portion 28 and a rearwardly extending flange portion 30 forming a generally right angle bend. The flange portion 30 has an inner edge 32 (FIGURE 2) which obliquely cuts across the front corners of the uppermost sheet in the stack when the stack is properly positioned on the platen 12.

Since the constructions for either side of the feeder are identical the following description will refer to only one side, it being understood that the other construction is identical.

Referring to FIGURES 2 and 3 each separator element 14 is formed with an operator arm 34 which is a rigid, L-shaped unit having a bearing portion 35 and a connector segment 37. The operator arm 34 is pivotally connected to the side guide being received on the stub shaft 38 through the bearing member 35.

The lift member 16 is provided with a lever arm 40 having integral therewith an actuator 42, a bearing portion 43 and a connector segment 45. The lever arm 40 and actuator are pivotally connected to the side guide being mounted on a stub shaft 44 extending from the side guide through the bearing portion 43.

The operator arm 34 and lever arm 40 are pivotally located at laterally spaced apart locations on the side guide 20 being linked together through a coupling bar 46 which is pivotally connected to the connector segments 37 and 45 by fastener pins 48 and 49, respectively. Movement of the lever 40 in either a lifting direction, as when the stack or paper is fed in, or a lowering direction, as when the sheets are being fed from the stack, imparts a pivoting action to the actuator 42. As the actuator 42 pivots about the stub shaft 44, the operator arm 34 is caused to pivot by the action of the coupling bar 46 linking the connector segments 37 and 45.

The solid line position of the element 14 shown in FIGURE 3 represents the lowered or inoperative position of the corner separators and the dotted outline position represents the raised or inoperative position for feeding one sheet at a time from the stack.

Any suitable means for translating the movement of the arm 16 to a lifting or lowering action for the members 14 may be used. For example, a gear train interconnecting the separator elements 14 and lift members 16 may be used with equal advantage. Camming action can also be employed to translate the movement of the lever 40 to control the separator elements.

The separator elements 14 need not be pivotally mounted, but they should be free to move downwardly in a generally vertical direction in order to maintain contact with the topmost sheet of the stack as the stack is depleted. However, the separator elements 14 and the lift members 16 are preferably pivotally mounted above the platen 12 at different points, i.e., on stub shafts 38 and 44, respectively. They can be mounted at the same pivot point, but if a very thick stack is positioned on the platen 12, the bight 50 of the corner separator elements 14 will be slightly above the top corner of the stack. This will provide inefficient and unreliable separating action.

In operation, the operator merely places a stack on the platen 12 and moves it toward the forward end 36. The levers 40 engage the moving stack 18 and ride up and over the top of the stack causing the actuators 42 to pivot about shaft 44. This produces lateral displacement of the coupling bars 46 towards the forward end 36 of the platen 12. As a result, the operator arms 34 pivot, raising the separator elements 14 to a level above the platen such that the flange portions 30 will rest on top of the stack 18 when the stack arrives at the forward end 36. When the corner separator elements 14 properly engage the stack 18, the flange portions 30 overlie the top corners of the stack and the stop portions 28 abut the front corners of the stack. By conventional sheet advancing means 60 resting on the top of the stack 18 the topmost sheet is advanced to the duplicator or like machine. The sheet advancing means is usually a friction feed device which, when driven, forces the top sheet against the stop portions 28 of the corner separator elements 14. Due to the action of the separator elements 14, the top sheet buckles slightly and the corners of this sheet flip out from under the flange portions 30. The sheet advancing means then continues to feed the separated sheet into the infeed station of the machine.

From the foregoing description it is apparent that a simple and reliable device is provided for automatically lifting the corner separators 14 so that the stack 18 is free to move under the flange portions 30. The tray device of my invention eliminates operator error because, whenever the operator positions a stack 18 on the platen 12, the corner separators 14 are raised. In its broadest aspect, my invention can be used with any separator device which must be moved into an operative position relative to the stack.

What is new and desired to be secured by Letters Patent of the United States is:

1. A tray used with a stack of sheets that are to be individually fed into a machine, comprising:
   a platen for supporting the stack;
   separator means mounted at the forward end of the platen and movable between an inoperative position and an operative position relative to the stack, said separator means in the operative position acting on the stack to separate a single sheet from the stack, and separate lift means coupled to the separator means and responsive to the loading of the stack on the platen for moving automatically the separator means to said operative position as the stack is loaded.

2. The tray defined by claim 1 wherein the separator means includes a flange portion which overlies the top of the stack when the separator is in the operative position and which separates the topmost sheet from the stack when said topmost sheet is fed into the machine.

3. The tray defined by claim 2 wherein, during loading of the stack on the platen, the lift means is actuated by the stack to move the separator means to a level above the platen allowing the stack to move under the flange portion.

4. The tray defined by claim 1 wherein said lift means is pivotally mounted above the platen on a support member.

5. The tray defined by claim 4 wherein the separator means is pivotally mounted above the platen on said support member.

6. The tray defined by claim 1 additionally including a pair of side guides mounted on the platen which restrict lateral movement of the stack.

7. The tray defined by claim 6 wherein each side guide has lift means pivotally mounted thereon.

8. The tray defined by claim 7 wherein each side guide has said separators means pivotally mounted therein and coupled to the lift means mounted on the same said guide.

9. A tray device used with a stack of sheets that are to be individually fed into a machine, comprising:
   a platen for supporting the stack,
   a side guide mounted on the platen for restricting the lateral movement of the stack,
   corner separator means including a stop portion and a flange portion joined together to form approximately a right angle bend,
   means for movably mounting the separator means at the front end of the platen on said side guide so that in the absence of sheets the separator means are in an inoperative position, and when a stack is loaded on the platen the separator means are in an operative position,
   said separator means in the operative position engaging a front corner of the stack to act on the topmost sheet of the stack to separate the topmost sheet from the stack, and
   separate operator means coupled to the separator means responsive to the loading of the stack on the platen for moving automatically the separator means to the operative position.

10. The device defined by claim 9 wherein said operator means includes pivotally mounted lever means disposed rearwardly of the front end of the platen so that, when a stack is moved towards said end, said stack engages the lever means causing said lever means to pivot and raise the separator means to a level which allows the stack to move under the flange portion and to abut the stop portion.

11. The tray defined by claim 9 wherein the flange portion has an inner edge which cuts obliquely across the front corner of the stack when the separator means is in the operative position.

12. The tray defined by claim 10 wherein said operator means raise the separator means to a level above the platen about equal to the height of the stack so that said flange portion rests on the corner of the stack.

13. The tray defined by claim 9 wherein the separator means are also pivotally mounted.

14. The tray defined by claim 13 wherein both said separator means and said operator means are pivotally mounted above the platen on a support member.

15. The tray defined by claim 14 wherein said support member serves as said side guide.

16. A tray used with a stack of sheets that are to be individually fed into a machine, comprising:

a platen for supporting the stack, separator means mounted at the forward end of the platen and movable upwardly and downwardly in a generally vertical direction between an operative position and an inoperative position relative to the stack, said separator means in the operative position acting on the stack to separate a single sheet from the stack when said sheet is fed into the machine, and separate means carried by the platen for moving the separator means between said operative and inoperative positions including (a) lever means which, when said stack is positioned on the platen by moving it towards the forward end, engage the stack and provide a lifting force, and (b) means connecting the lever means and separator means together which, in response to the lifting force, raise automatically the separator means upwardly until said separator means are moved to said operative position.

17. The tray defined by claim 16 wherein said separator means and lever means are pivotally mounted at different points above said tray, and said connecting means includes a member coupled between said separator means and lever means which enables the separator means to move in unison with the lever means.

References Cited

UNITED STATES PATENTS

| | | | |
|---|---|---|---|
| 3,285,601 | 11/1966 | Zeuthen | 271—61 |
| 3,369,804 | 2/1968 | Schulze | 271—21 |

RICHARD E. AEGERTER, Primary Examiner

U.S. Cl. X.R.

271—21